United States Patent [19]
Tamai

[11] Patent Number: 4,910,494
[45] Date of Patent: Mar. 20, 1990

[54] AUTOMOTIVE VEHICLE CONTROL SYSTEM

[75] Inventor: Hidefumi Tamai, Edina, Japan

[73] Assignee: Isuzu Motors Limited, Tokyo, Japan

[21] Appl. No.: 331,080

[22] Filed: Mar. 28, 1989

Related U.S. Application Data

[63] Continuation of Ser. No. 63,430, Jun. 18, 1987, abandoned.

[30] Foreign Application Priority Data

Jun. 19, 1986 [JP] Japan ............................ 61-143495

[51] Int. Cl.⁴ .................................................. B60Q 1/00
[52] U.S. Cl. ................................. 340/438; 364/431.11
[58] Field of Search ................. 340/52 R, 52 F, 438;
371/9, 11, 68; 307/10 R; 364/431.11; 123/479;
318/564

[56] References Cited

U.S. PATENT DOCUMENTS

| | | | |
|---|---|---|---|
| 4,032,757 | 6/1977 | Eccles | 364/431.11 X |
| 4,251,873 | 2/1981 | Loby | 371/9 X |
| 4,350,225 | 9/1982 | Sakata et al. | 371/9 X |
| 4,532,594 | 7/1985 | Hosaka et al. | 371/9 X |

FOREIGN PATENT DOCUMENTS

| | | |
|---|---|---|
| 0096510 | 12/1983 | European Pat. Off. . |
| 0170920 | 2/1986 | European Pat. Off. . |
| 2045968 | 11/1980 | United Kingdom . |
| 2104247 | 3/1983 | United Kingdom . |
| 2125189 | 11/1984 | United Kingdom . |
| 2140583 | 11/1984 | United Kingdom . |
| 2158613 | 11/1985 | United Kingdom . |

*Primary Examiner*—Joseph A. Orsino
*Assistant Examiner*—Jeffery A. Hofsass
*Attorney, Agent, or Firm*—Staas & Halsey

[57] ABSTRACT

An automotive vehicle control system is equipped with a main electronic control unit for controlling devices mounted on the vehicle, and an emergency electronic control unit for backing up the main electronic control unit. Both electronic control units transmit diagnostic signals, receive the diagnostic signals from each other and diagnose them for abnormalities, whereby a fault in the main electronic control unit is diagnosed by the emergency electronic control unit and a fault in the emergency electronic control unit is diagnosed by the main electronic control unit.

4 Claims, 4 Drawing Sheets

AUTOMOTIVE VEHICLE CONTROL SYSTEM

This is a continuation of co-pending application Ser. No. 07/063,430 filed on June 18, 1987 now abandoned.

BACKGROUND OF THE INVENTION

This invention relates to control of an automotive vehicle equipped with an electronic control unit for controlling devices mounted on the vehicle.

The appearance of electronically controlled vehicles controlled by an electronic control unit (commonly referred to as an "ECU") comprising a microcomputer has increased in recent years. In addition to control of the rotational speed of the internal combustion engine, control of gear changeover in a transmission and control of a clutch, these vehicles also have various accessories controlled by the electronic control unit. Based on signals from various sensors provided on a variety of actuators, which drive devices to be controlled, the electronic control unit calculates control variables for the various actuators that are controlled and then outputs the corresponding signals to these actuators to control the operation of each device. Such a system is illustrated in Japanese Patent Application No. 60-217471 filed by the present applicant. This electronically controlled vehicle not only includes an electronic control unit (main electronic control unit) for controlling various actuators that is also equipped with emergency actuators for back-up purposes in the event that any actuator or the main control unit itself develops an abnormality such as breakage of a wire or short circuit, and an emergency electronic control unit for controlling the emergency actuators. If the main electronic control unit should happen to malfunction, the system is switched over to the emergency electronic control unit to assure that the vehicle will continue to travel safely.

In this electronically controlled vehicle, however, the emergency electronic control unit is not used when the various actuators are operating normally, so that it is impossible for the driver to know whether the emergency electronic control unit has developed an abnormality.

Since the emergency electronic control unit must operate without failure if the main electronic control unit malfunctions, it is necessary that some form of warning means be provided to inform the driver of whether the emergency electronic control unit is operating abnormally, even when the vehicle is operating in the normal traveling mode, i.e. under the control of the main electronic control unit.

SUMMARY OF THE INVENTION

Accordingly, an object of the present invention is to provide an electronic automotive vehicle control system equipped with a fault detector that indicates to a driver that an whether the emergency electronic control unit is operating abnormally.

Another object of the present invention is to provide an automotive vehicle control system equipped with a fault detector capable of detecting whether the main electronic control unit is operating abnormally.

According to the present invention, the foregoing and other objects of the present invention are attained by providing an automotive vehicle control system equipped with a control unit for controlling devices mounted on the vehicle. The control system comprises a main electronic control unit for controlling the devices mounted on the vehicle, an emergency electronic control unit for backing up the main electronic control unit, and fault detecting means provided in each of the electronic control units for diagnosing faults in the other.

Thus, the automotive vehicle control system of the invention includes fault detecting means provided in the main electronic control unit for diagnosing faults in and monitoring the emergency electronic control unit, and fault detecting means provided in the emergency electronic control unit for diagnosing faults in and monitoring the main electronic control unit. As a result, safe operation of the vehicle is assured at all times since constant monitoring is performed to determine whether both the main electronic control unit and emergency electronic control unit are operating normally or abnormally.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

An automotive vehicle control system according to the invention will now be described in detail with reference to the drawings.

Figure 1:
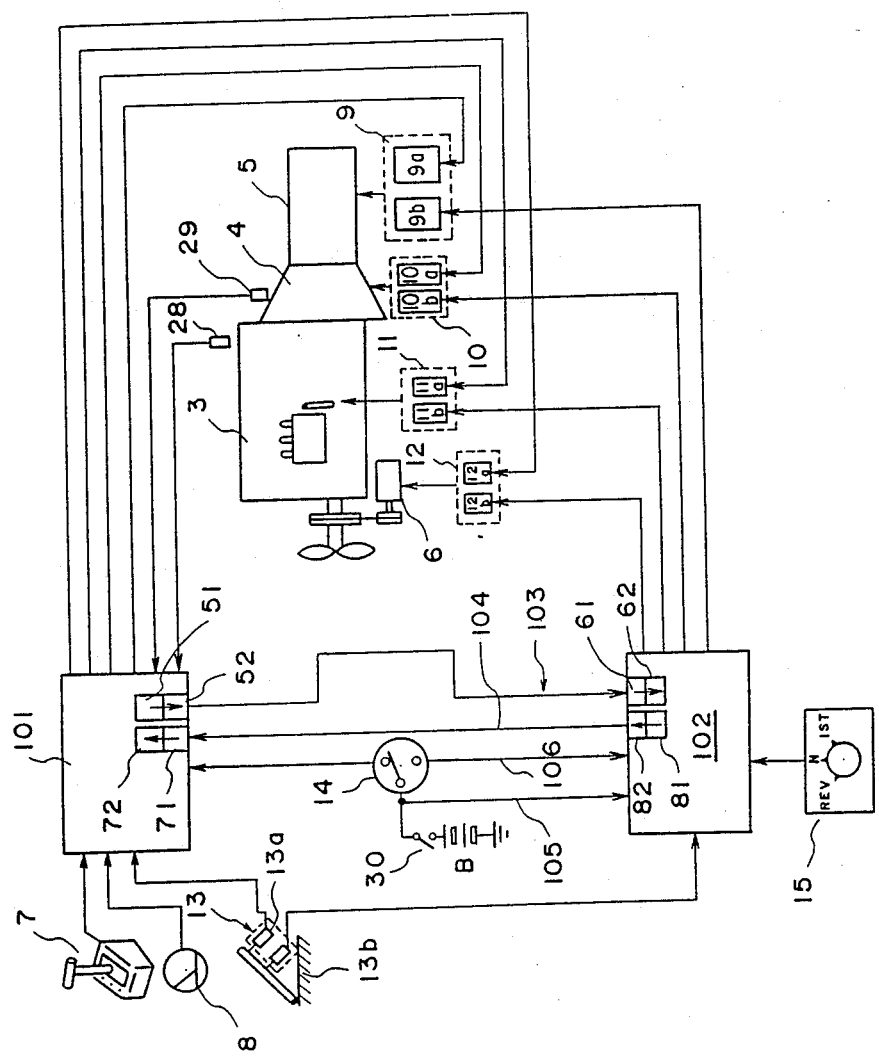
FIG. 1 is a block diagram of a vehicle control system according to the present invention.

In FIG. 1, numeral 101 denotes a main electronic control unit comprising a microcomputer. The main electronic control unit 101 includes internal such as a central processor, memory and input/output means. It further includes waveform shaping means 51 which produces a communication waveform to initiate emergency electronic control unit 102, for self-diagnosis transmitting means 52 for transmitting the communication waveforms to the emergency electronic control unit 102; receiving means 71 for receiving the fault diagnosis waveform from the emergency electronic control unit 102; and diagnostic means 72 for diagnosing the received waveform.

The emergency electronic control unit 102 comprises a microcomputer and, like the main electronic control unit 101, includes internal devices such as a central processor, memory and input/output means. Also included in the emergency electronic control unit 102 are waveform shaping means 81 which produces a communication waveform to initiate main electronic control unit 101 for self-diagnosis; transmitting means 82 for transmitting the communication waveform; receiving means 61 for receiving the fault diagnosis waveform from the main electronic control unit 101; and diagnostic means 62 for diagnosing the received waveform. The transmitting means 52 and receiving means 61 are connected by a communication line 103, and the transmitting means 82 and receiving means 71 are connected by a communication line 104.

Numeral 3 denotes an engine for which an engine actuator 11 is provided. The actuator 11 comprises an engine actuator 11a for normal operation, and an emergency engine actuator 11b. Numeral 4 denotes a clutch having a clutch actuator 10 comprising a clutch actuator 10a for normal operation, and an emergency clutch actuator 10b. Numeral 5 denotes a transmission having a transmission actuator 9 comprising a transmission actuator 9a for normal operation and an emergency transmission actuator 9b. Numeral 6 denotes a stator, and numeral 12 represents a stator drive unit comprising a stator drive 12a for normal operation and an emergency stator drive 12b.

Numeral 7 designates a select lever and numeral 8 designates a velocity sensor. Numeral 13 denotes an accelerator sensor comprising an accelerator sensor 13a for normal operation, and an emergency accelerator sensor 13b. The accelerator sensor 13b comprises a potentiometer which, when a fault occurs, generates an input signal for controlling the clutch actuator 10 and a motor 25 (FIG. 3) simultaneously, or for controlling solely the motor 25, as will be described below. Numeral 14 denotes a power supply changeover switch for changing over a power supply between the main electronic control unit 101 and emergency electronic control unit 102.

Numeral 15 denotes an emergency gear switch by which the driver designates a gear stage when the vehicle is traveling during an abnormality. The switch 15 allows selection of reverse, neutral or first gear.

Numeral 28 denotes an engine rotation sensor, and numerals 29 denotes an input shaft rotation sensor.

When operation is normal, the main electronic control unit 101 receives signals from the selector lever 7, vehicle velocity sensor 8, accelerator sensor 13a for normal operation, engine rotation sensor 28 and input shaft rotation sensor 29, as well as other input signals such as a clutch stroke signal and gear position signal, not shown. The main electronic control unit 101 responds by driving the transmission actuator 9a for normal operation, the clutch actuator 10a for normal operation, the engine actuator 11a for normal operation and the stator drive 12a for normal operation, thereby performing suitable transmission control, clutch control and engine control.

Meanwhile, if the main electronic control unit 101 malfunctions, power is cut off from the main electronic control unit 101 and the emergency electronic control unit 102 is energized simultaneously by the power supply changeover switch 14. The emergency electronic control unit 102 turns on the emergency state drive 12b to prepare for engine start and, at the same time, responds to signals from the emergency gear switch 15 and emergency accelerator sensor 13b by shifting the gears of the transmission, engaging and disengaging the clutch and controlling the engine.

Numeral 30 denotes a key switch provided between the power supply changeover switch 14 and battery B. When the key switch 30 is closed, a voltage is applied to both the main electronic control unit 101 and emergency electronic control unit 102 by the power supply changeover switch 14, which is in contact with the main electronic control unit 101 at all times, and a line 105 connected to the emergency electronic control unit 102.

Figure 2:
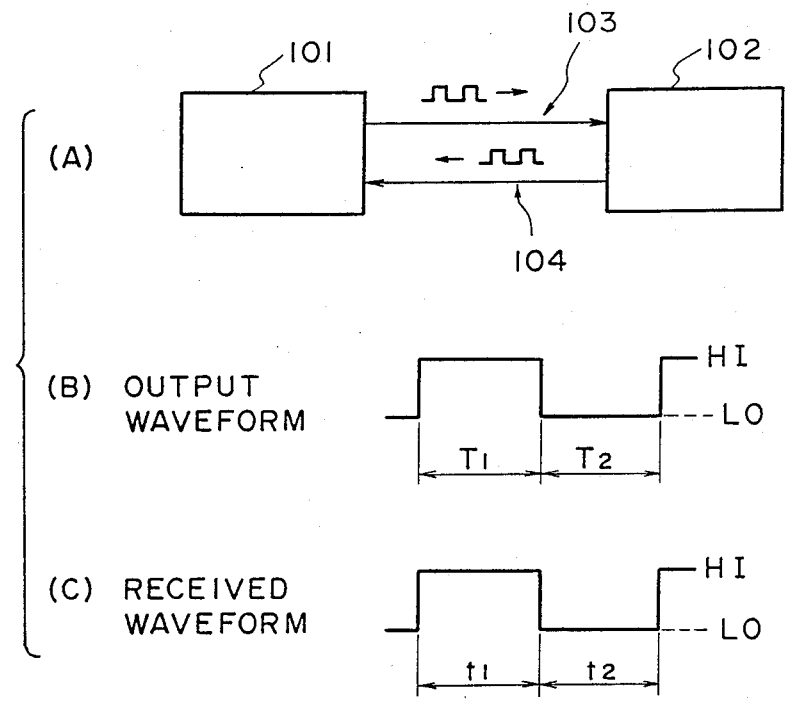
FIGS. 2A-C illustrate communication during fault diagnosis.

FIGS. 2A–C illustrate diagnostic communications provided between the main electronic control unit 101 and emergency electronic control unit 102. FIG. 2(A) is a simple block diagram, and FIG. 2(B) illustrates an output waveform of a diagnostic signal generated by the main electronic control unit 101 and emergency electronic control unit 102. The output waveform is a pulsed waveform having a high-level pulse width $T_1$ and a low-level pulse width $T_2$. FIG. 2(C) illustrates a waveform of the aforementioned diagnostic signal, which is generated by the main electronic control unit 101 and emergency electronic control unit 102, as it appears when received by the receiving means 61, 71 (FIG. 1). The received waveform is a pulsed waveform having a high level pulse width $t_1$ and a low level pulse width $t_2$. In the present invention, abnormalities are judged in the following manner:

A. Fault diagnosis of the main electronic control unit 101

The waveform shaping means 51 of the main electronic control unit 101 constantly produces, by means of software, a pulsed waveform having a cycle $T_1 = T_2 = 10$ msec (duty cycle: 50%), by way of example. The waveform is applied, without interruption, to the emergency electronic control unit 102 via the transmitting means 52. The dianostic signal comprising these pulses is received by the receiving means 61 of the emergency electronic control unit 102. The diagnostic means 62 of the emergency electronic control unit 102 checks whether pulse widths $t_1$, $t_2$ fall within predetermined pulse width limits whenever the diagnostic signal is received by the receiving means 61. When a predetermined number of diagnostic signals having pulse widths not within the predetermined limits are received, or when a predetermined number of the pulses are missing, the emergency electronic control unit 102 determines that the main electronic control unit 101 cannot form pulses within the predetermined pulse width limits because of some malfunction. The main electronic control unit 101 is therefore determined to be faulty at such time.

B. Fault diagnosis of the emergency electronic control unit 102

The waveform shaping means 81 of the emergency electronic control unit 102 produces, by means of software, one period of a pulsed waveform having a cycle $T_1 = T_2 = 10$ msec (duty cycle: 50%) every 200 msec, by way of example. The waveform is applied to the main electronic control unit 101 via the transmitting means 82. The diagnostic signal comprising these pulses is received by the receiving means 71 of the main electronic control unit 101. The diagnostic means 72 of main electronic control unit 101 checks whether pulse widths $t_1$, $t_2$ fall within predetermined pulse width limits whenever the diagnostic signal is received by the receiving means 71. When a diagnostic signal having pulse widths not within the predetermined limits is received, or when the diagnostic signal cannot be received despite the fact that it is time for the signal to be generated, the main electronic control unit 101 determines that the emergency electronic control unit 102 cannot form pulses within the predetermined pulse width limits, or that the diagnostic signal itself cannot be generated, because of some malfunction. The emergency electronic control unit 102 is therefore determined to be faulty at such time.

Figure 3:
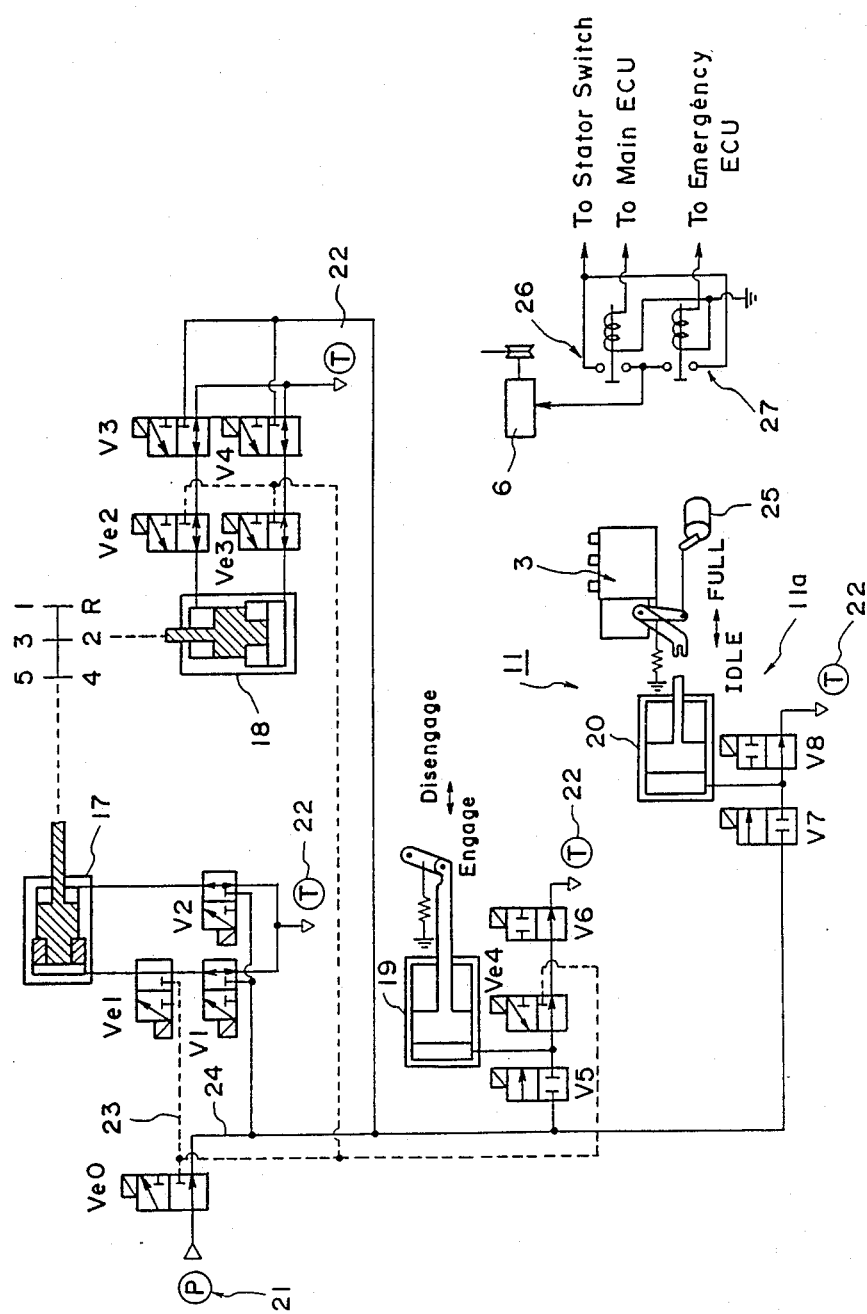
FIG. 3 is a block diagram illustrating the details of actuators for various components.

The details of the actuators will now be described with reference to FIG. 3. Described first will be the construction of the actuators for control when operation is normal. Numeral 17 denotes a selector actuator for the transmission 5. The selector actuator 17 includes a piston that is stoppable at three positions, and is adapted to detect three select positions, namely a first speed—R position, a second speed—third speed position, and a fourth speed—fifth speed position, by a combination of electromagnetic valves $V_1$, $V_2$. In the illustrated embodiment, the first speed—R position is selected by turning on the electromagnetic valve $V_1$ and turning off the electromagnetic valve $V_2$. The second speed—third speed position is selected by turning on the electromagnetic valves $V_1$, $V_2$. This fourth speed—fifth speed position is selected by turning on the electromagnetic valve $V_2$ and turning off the electromagnetic valve $V_1$. Numeral 18 denotes a shift actuator having a structure similar to that of the select actuator 17, and determines a shift position by a combination of electromagnetic valves $V_3$, $V_4$. The select actuator 17, shift actuator 18, electromagnetic valves $V_1$, $V_2$, $V_3$ and $V_4$ comprise the aforementioned transmission actuator 9a for normal operation (FIG. 1).

Numeral 19 denotes an actuator for actuating the clutch 4. The actuator 19 is biased in one direction by the force of a spring provided on the clutch 4 and is of the type in which pressure is applied to one side of a piston so as to overcome the biasing force. The clutch is engaged and disengaged by electromagnetic valves $V_5$, $V_6$. In the illustrated embodiment of FIG. 3, the clutch is disengaged by turning on the electromagnetic valves $V_5$, $V_6$ and is engaged by turning off these electromagnetic valves. The actuator 19 and electromagnetic valves $V_5$, $V_6$ comprise the clutch actuator 10a for normal operation (FIG. 1).

Numeral 20a denotes an engine actuator having a structure similar to that of the clutch actuator 10a and controls engine rotation by a combination of electromagnetic valves $V_7$, $V_8$. The engine actuator 20 and electromagnetic valves $V_7$, $V_8$ comprise the engine actuator 11a for normal operation (FIG. 1). It should be noted that the actuator 11a for normal engine operation is comprises a pulse motor.

Numeral 26 denotes a stator relay turned on by an engine start enable signal from the main electronic control unit 101 when operation is normal, thereby establishing an engine start preparatory state. The stator relay 26 comprises the stator drive 12a for normal operation (FIG. 1).

The construction of the emergency actuators will be described next. In FIG. 3, an electromagnetic valve $V_{e0}$ is a main valve for switching the hydraulic pressure source from the actuators for normal operation to the emergency actuators. The valve $V_{e0}$ is turned on in an emergency to cut off the supply of pressure to the actuators for normal operation and to supply pressure to the emergency actuators.

An electromagnetic valve $V_{e1}$ is an emergency electromagnetic valve associated with the gear select actuator 17. When the valve is turned on, the select actuator 17 selects the first speed—R position in accordance with the illustrated embodiment.

Electromagnetic valves $V_{e2}$, $V_{e3}$ are emergency electromagnetic valves associated with the gear shift actuator 18. These valves operate in the same manner as the electromagnetic valves $V_3$, $V_4$ of the actuator for normal operation.

The electromagnetic valves $V_{e1}$, $V_{e2}$, $V_{e3}$, the selector actuator 17 and the shift actuator 18 comprise the emergency transmission actuator 9b (FIG. 1).

An electromagnetic valve $V_{e4}$ is an emergency electromagnetic valve associated with the clutch actuator 19. The clutch is disengaged when the valve is turned on and engaged when the valve is turned off. The electromagnetic valve $V_{e4}$ and the clutch actuator 19 comprise the emergency clutch actuator 10b (FIG. 1).

The motor 25 is an actuator for emergency control and is connected to a rod control lever (or rack) of the engine. The motor 25 comprises the emergency engine actuator 11b (FIG. 1).

An emergency stator relay 27 is similar to the stator relay 26 for control during normal operation, and comprises the emeregency stator drive 12b (FIG. 1). It should be noted that an emergency hydraulic pressure system 23 is indicated by the dashed lines, and that a hydraulic pressure system 24 for normal operation is indicated by the solid lines. Numerals 21, 22 denote a hydraulic pressure source and a tank, respectively.

The operation of the system shown in FIG. 3 will now be described. When the main electronic control unit 101 and emergency electronic control unit 102 are both operating normally, oil merely flows through the emergency electromagnetic valves and the actuators operate in the usual manner. When the main electronic control unit 101 is diagnosed to be faulty, the driver operates the power supply changeover switch 14 to switch the supply of power from the main electronic control unit 101 to the emergency electronic control unit 102 via line 106. In response, the emergency electronic control unit 102 actuates the emergency electromagnetic valves. The hydraulic system switches over to the emergency hydraulic circuit, and each actuator operates in an emergency state.

Figure 4:
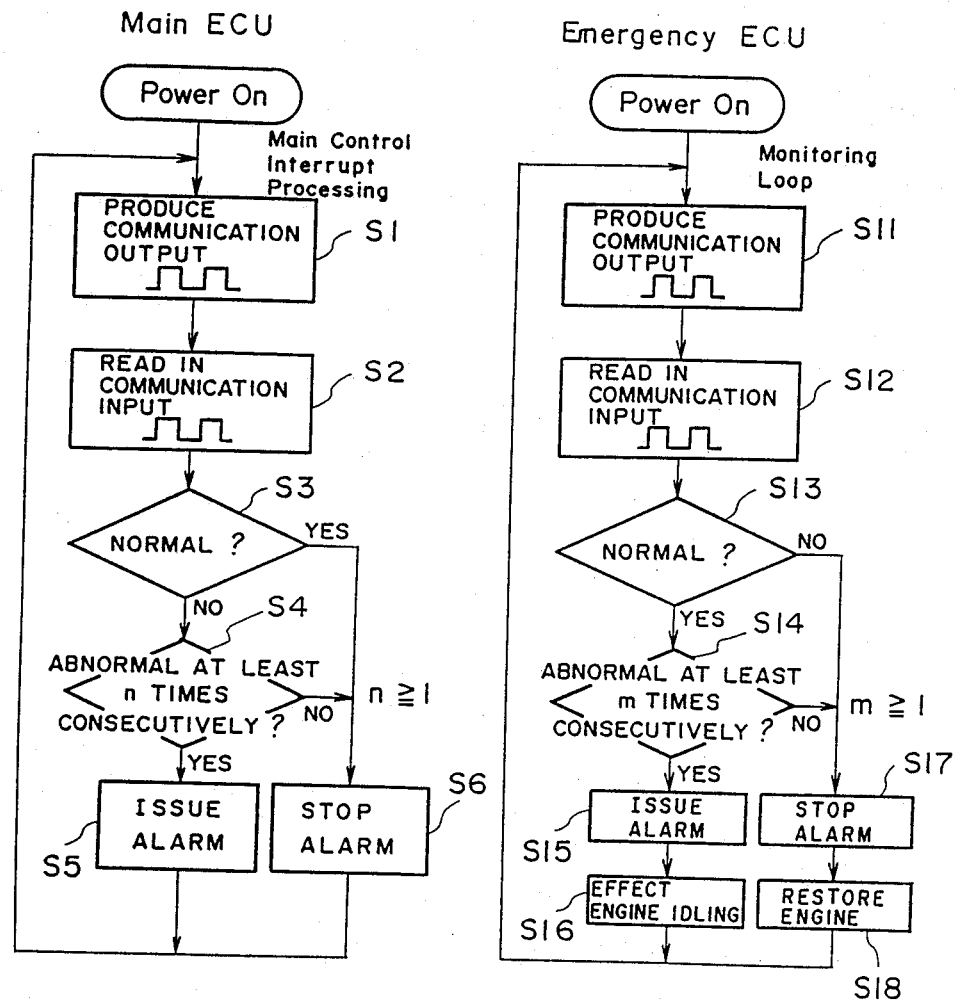
FIG. 4 is a flowchart of the control logic in accordance with the invention.

The control operation of the vehicle control system equipped with a fault detector will now be described with reference to the flowchart of FIG. 4.

When the key switch 30 is closed to supply voltage to the main electronic control unit 101 and emergency electronic control unit 102, these control units generate diagnostic signals. The diagnostic signal from the main electronic control unit 101 is always delivered to the emergency electronic control unit 102 first (step s1).

Next, the diagnostic signal generated in the emergency electronic control unit 102 is read in by the main electronic control unit 101 (step S2). In response, the main routine of the main electronic control unit 101 is interrupted and is judged whether the diagnostic signal is normal or abnormal (step S3). If the decision rendered at step S3 is that the diagnostic signal is abnormal, then it is determined at a step S4 whether the abnormality is detected at least n consecutive times. If the answer at step S4 is YES, then an alarm is issued at step S5 to inform the driver of the fact that the emergency electronic control unit 102 is faulty. If the decision rendered at step S3 is that the diagnostic signal is normal, or if an abnormality is not detected n consecutive times at step S4, then it is decided that the emergency electronic control unit 102 is operating normally and the alarm is not issued (step S6).

Meanwhile, at the same time that a voltage is applied to the emergency electronic control unit 102, i.e., when key switch 30 is closed, the emergency electronic control unit 102 starts operating and a diagnostic signal comprising a set number of pulses is generated and outputted to the main electronic control unit 101 e.g. every 200 msec (step S11). Further, the diagnostic signal being transmitted at all times by the main electronic control unit 101 is read in (step S12) and it is decided whether the diagnostic signal is normal (step S13). If the signal is found to be abnormal, it is determined whether the signal is abnormal for at least m consecutive times (step S14). If the answer at step S14 is YES, a decision is rendered to the effect that the main electronic control unit 101 is faulty, an alarm is issued (step S15) and the engine is placed in an idling state (step S16). This is followed by switching over to back-up operation to cope with the emergency. If the signal is found to be normal or an abnormality is not detected at least m consecutive times, no alarm is issued (step S17). If the engine is running in the idling state, the engine is returned to the former running condition (step S18).

Thus, as described in detail above, the main electronic control unit is provided with fault detecting means for monitoring the emergency electronic control unit and the emergency electronic control unit is provided with fault detecting means for monitoring the main electronic control unit. Therefore, both the main electronic control unit and emergency electronic control unit can be monitored at all times to determine whether they are operating normally or abnormally. This assures safe vehicle operation at all times. Furthermore, the driver is immediately informed of an abnormality in either of the electronic control units to prevent the occurrence of an accident.

As many apparently widely different embodiments of the present invention can be made without departing from the spirit and scope thereof, it is to be understood that the invention is not limited to the specific embodiments thereof except as defined in the appended claims.

What I claim is:

1. An automotive vehicle control system having an electronic control unit for controlling an engine, clutch, and transmission of an automotive vehicle, said system comprising:

normal and emergency fuel control actuators connected to the engine and controlling a flow of fuel to the engine;

normal and emergency clutch control actuators connected to and controlling the clutch;

normal and emergency transmission control actuators connected to and controlling the transmission;

a main electronic control unit connected to and controlling said normal control actuators;

an emergency electronic control unit connected to and controlling said emergency control actuators;

fault detecting means for detecting faults in said main electronic control unit and said emergency electronic control unit;

alarm means for emitting an alarm when a fault is detected by said fault detecting means; and power supply changeover means for switching off electric power to said main electronic control unit while simultaneously switching power on to said emergency electronic control unit when a fault is detected in said main electronic control unit by said fault detecting means.

2. An automotive vehicle control system according to claim 1, wherein said emergency electronic control unit comprises means for controlling said emergency fuel control actuator to idle the engine when a fault is detected in said main electronic control unit by said fault detecting means.

3. An automotive vehicle control system according to claim 1, further comprising emergency gear selecting means for generating signals to manually select gears of said transmission through said emergency transmission control actuator when a fault is detected in said main electronic control unit by said fault detecting means.

4. An automotive vehicle control system according to claim 3, wherein said emergency electronic control unit comprises means for controlling said emergency transmission control actuator in response to receiving the signals generated by said emergency gear selecting means.

* * * * *

UNITED STATES PATENT AND TRADEMARK OFFICE
CERTIFICATE OF CORRECTION

PATENT NO. : 4,910,494
DATED : MARCH 20, 1990
INVENTOR(S) : HIDEFUMI TAMAI

It is certified that error appears in the above-identified patent and that said Letters Patent is hereby corrected as shown below:

Col. 1, line 57, "whether the" should be deleted.

Col. 2, line 42, after "internal" insert --devices--.

Col. 3, line 32, "numerals" should be --numeral--.
line 51, "state" should be --stator--.

Col. 5, line 10, "This" should be --The--;
line 32, "20a" should be --20--;
line 39, "is" should be deleted.

Col. 6, line 45, after "and" insert --it--.

Signed and Sealed this

Ninth Day of April, 1991

Attest:

HARRY F. MANBECK, JR.

*Attesting Officer*  *Commissioner of Patents and Trademarks*